Oct. 30, 1956 H. J. THOMAS, JR 2,769,087

HIGH FREQUENCY OSCILLATION CONTROL

Filed April 8, 1954 2 Sheets-Sheet 1

INVENTOR
HARRY J. THOMAS, JR
BY Elmer J. Gorn
ATTORNEY

Oct. 30, 1956

H. J. THOMAS, JR 2,769,087

HIGH FREQUENCY OSCILLATION CONTROL

Filed April 8, 1954

2 Sheets-Sheet 2

INVENTOR
HARRY J. THOMAS, JR.
BY Elmer J. Gorn
ATTORNEY

United States Patent Office 2,769,087

Patented Oct. 30, 1956

2,769,087

HIGH FREQUENCY OSCILLATION CONTROL

Harry J. Thomas, Jr., Waltham, Mass., assignor to Raytheon Manufacturing Company, Waltham, Mass., a corporation of Delaware Application April 8, 1954, Serial No. 421,775

6 Claims. (Cl. 250—36)

This invention relates to high frequency oscillation control, and particularly to the stabilization of the frequency of oscillation of a klystron by regulation of the ambient temperature.

The invention is characterized by the employment of a heat regulating method which comprises the step of supplementing the normal dependence upon the radiation plus convection type of heat flow by providing a second heat flow path along which heat may be transferred to a thermostatic control element by direct conduction thereto. In the illustrated embodiment of the invention, the supplementary heat flow path takes the form of clamping apparatus engageable with the outer surface of the klystron housing and adapted to resiliently grip the klystron and thereby hold it firmly against vibration or displacement, and at the same time remove heat rapidly by direct conduction to the outer wall surfaces of a surrounding heat regulating enclosure, which wall surfaces constitute a region of relatively large mass and surface area, serving as an intermediate buffer zone of controlled, substantially constant temperature, located between the relatively hot klystron oscillator and the relatively cool, variable-temperature exterior atmosphere.

Another feature of the invention is the utilization in the direct conduction heat flow path referred to of an extremely thin, but relatively widespread, lamination of mechanically tough dielectric material capable of preventing substantial leakage of the klystron operating potential (which may be several hundred volts) yet simultaneously serving to facilitate rapid heat exchange between the clamping apparatus above described and the surrounding heat dispersing enclosure. The efficiency of structures embodying the method of temperature regulation herein described has the advantageous result of simplifying the electrical and electronic problems attendant upon efforts to comply with the particular operating frequency and operating potential specifications of any given radiant energy installation, in that the adoption of the herein described principles of heat transfer and control automatically eliminates the necessity of confining the relative potential requirements of the local oscillator circuity within any particular voltage range. In other words, by the use of the invention herein disclosed, it becomes possible to utilize in the klystron excitation circuitry whatever operating potential is most convenient from purely electrical and electronic considerations involved in a specific installation, since the relatively large capacity for heat abduction and dissipation that is inherent in the disclosed invention is quite adequate to prevent excessive heating of the klystron regardless of potential or potential grounding arrangements while at the same time assuring against appreciable leakage of operating potential.

Other and further advantages of this invention will become apparent as the description thereof progresses, reference being had to the accompanying drawings, wherein.

Figure 1:
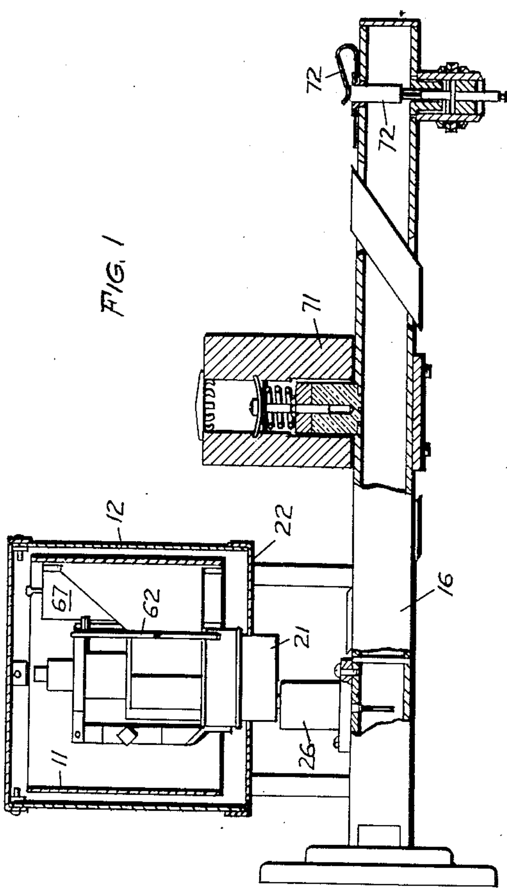
Fig. 1 is a longitudinal sectional view of a high frequency wave guide structure for transmission of radiant energy and includes as an associated part of the structure apparatus embodying and adapted to operate in accordance with the present invention.
Figure 2:
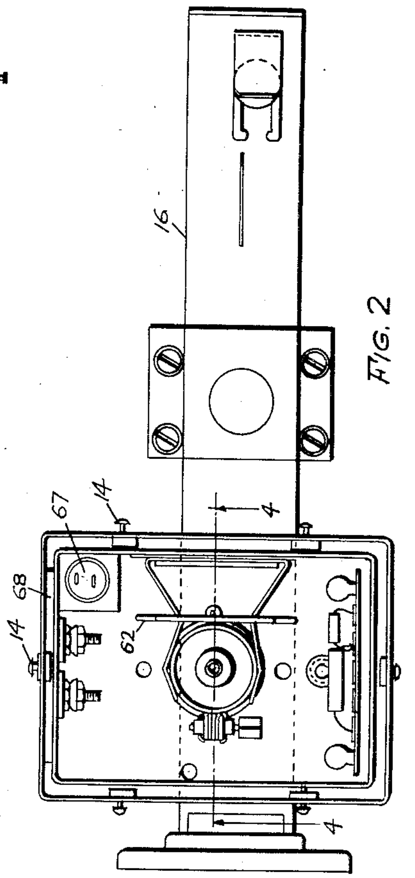
Fig. 2 is a top plan view of the apparatus disclosed in Fig. 1 with certain parts omitted to improve the clarity of the illustration.
Figure 3:
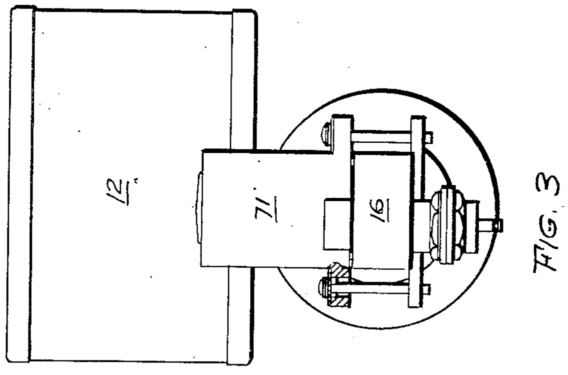
Fig. 3 is an end elevation view of the apparatus of Fig. 1.
Figure 4:
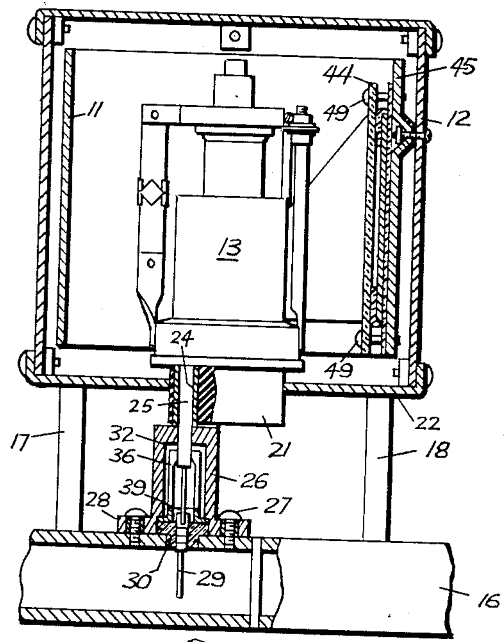
Fig. 4 is a sectional view along the line 4—4 of Fig. 2.
Figure 7:
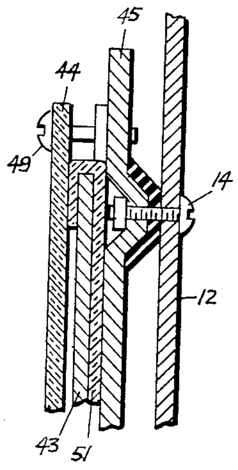
Fig. 7 is a transverse sectional view of certain parts of Fig. 4, on a larger scale.

Referring first to Figs. 1, 2, and 4, the invention is therein shown as including inner and outer rectangular enclosures 11 and 12, surrounding a klystron type of local oscillator indicated in outline at 13, the inner enclosure 11 being supported upon the outer enclosure 12 through the instrumentality of a plurality of fastening means 14 designed to be of minimum heat transferring capacity, and the outer enclosure 12 being in turn supported upon the wave guide conduit 16 by means of the intervening parallel brackets 17 and 18 secured at their ends to the enclosure 12 and the wave guide 16, respectively. The klystron assembly 13 includes a terminal-carrying base 21 of insulating material, which base is adapted to fit within and be supported by the base plate 22 of the enclosure 12. Included with the klystron base 21 is a thin metallic sleeve 24 adapted to receive coaxial conductor 25 extending into the transversely disposed auxiliary wave guide structure 26 attached to the principal wave guide structure 16 by fastening screws 27 serving to unite the flange portion 28 with the upper wall of said wave guide 16. A cooperating radiating probe 29 is retained in a bushing 30 interposed between the wall of wave guide 16 and an interior shoulder of the auxiliary wave guide 26, the said probe 29 being adapted to telescopically receive the lower end 32 of the conductor 25 after the latter passes through the intervening centering cage 36 which is retained within the bore of the transverse wave guide 26 through the agency of a retaining ferrule 39. Although not illustrated, it will be understood that the klystron center conductor circuit is suitably electrically insulated from the wave guide 16.

The heat abducting assembly for transferring excessive heat from the klystron 13 to the enclosure 11 is illustrated as constituted by a generally U-shaped flat sided element of thin metallic material having good heat conducting properties, with its central flat section 43 (shown best in Fig. 5) being adapted to be held in spaced relationship to a pair of parallel walls 44 and 45, the latter being one of the four sides constituting the rectangular enclosure 11 which is of sheet metal, such as aluminum or equivalent material of good heat flow properties, and the plate 44 being of molded plastic material of sufficient toughness and adapted to exert clamping pressure upon the flat section 43 of the heat transferring element in response to the tightening of the fastening screws 49 which hold the plate 44 in assembled relationship to the wall 45 of the inner enclosure 11, the pressure being applied from the plate 44 to the said flat section 43 of the heat transferring member through the agency of an intervening element 51 having its upper and lower sections folded around the upper and lower edges, respectively, of the member 43 so as to interpose an additional layer of the material 51 between the plate 44 and the outer surface of the member 43. The element 51 may be "Mylar," which is the trade name of one type of polyester film, or it may be "Teflon"-impregnated fiber glass, mica, isinglass, or similar dielectric material sufficiently flexible to permit its being folded about the edges of the member 43 in the manner just described and yet sufficiently wear-resistant and of sufficient tensile strength to serve as a continuous layer of electrically insulating material preventing any appreciable loss of potential as between the klystron casing 13 and the enclosure 11, while at the same time being sufficiently thin and sufficiently widespread in area to facilitate ready transfer of heat from the member 43 directly to the wall 45 of the enclosure 11.

Figure 5:
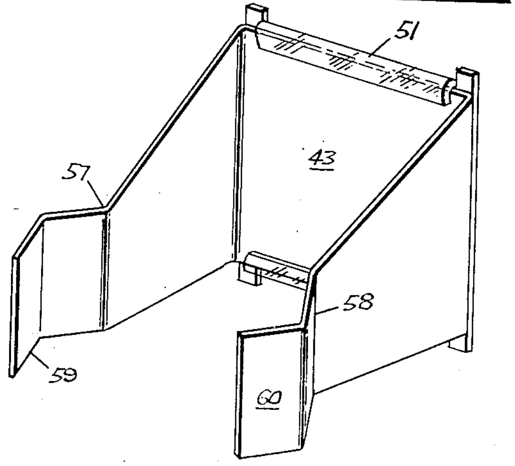
Fig. 5 is a perspective view of the clamping apparatus, with an indication of the method of applying to such clamping apparatus a dielectric component adapted to produce the combined insulating and heat transferring effects herein described.
Figure 6:
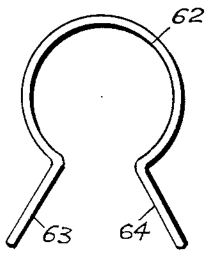
Fig. 6 is a view of a clamping ring adapted to complete the clamping apparatus shown in Fig. 5.

To insure equally good heat transfer from the surface of the klystron 13 to the member 43, the sections of said member immediately adjacent the central section are bent inwardly in converging fashion to points indicated in Fig. 5 by reference numerals 57 and 58, at which points the material flares outwardly and then is again bent inwardly to form clasping sections 59 and 50 adapted to be pressed firmly against the outer cylindrical surface of the klystron 13 and held in firm engagement therewith by clamping pressure exerted thereon through the action of a clamping ring 62 (see Fig. 6) of spring steel or equivalent resilient material, which clamping ring is adapted to be snapped in position with its lower end sections 63 and 64 in engagement with the outer surface of the member 43 along the junction lines 57 and 58, to occupy the relationship thereto which is indicated in Figs. 1 and 2. In addition to the clamping pressure thus exerted by the ring 62, the clamping effect may be increased, if so desired, by selection of an inherently resilient material for incorporation into the member 43 itself.

The heat transferred from the klystron 13 to the wall 45 by a member 43, in the manner just described, is directly effective upon the thermal controlling element 67 (Figs. 1 and 2), thus permitting said element to exercise precise control of the electrical operation of the heater element 68 governing the supply of generated heat, and thereby insuring close control of the generated frequency, it being understood that electrical connections between the thermal element 67 and the heater 68 will corespond to those conventional in the art, the details of which are not essential to an understanding of the present invention.

The wave guide structure 16 illustrated in Figs. 1 and 2 is shown as including a resonant cavity assembly 71 and a crystal controlled detection circuit assembly 72, neither of which constitutes any part of the invention herein claimed. The disclosed cavity assembly 71 forms the subject matter of claims in copending application No. 421,730, filed by Joseph Bakura and Wilbur Pritchard on even date herewith, and the crystal carrying assembly 72 forms the subject matter of claims in application No. 421,731, filed by Carlo P. Domenichini and Joseph Bakura on even date herewith, both said applications being assigned to the assignee of the subject application.

The invention is not limited to the particular details of construction, materials and processes described, as many equivalents will suggest themselves to those skilled in the art. It is, accordingly, desired that the appended claims be given a broad interpretation commensurate with the scope of the invention within the art.

What is claimed is:

1. In a microwave system employing a local oscillator having an excitation circuit whose operating voltage controls the generated microwave frequency, means for controlling the frequency generated by said oscillator, said means comprising a heat-supplying circuit including a thermal control element, and means providing a second heat flow path along which heat may be removed from said oscillator and transferred to said thermal control element by direct conduction thereto, to supplement the heat removal action produced by radiation and convection, said second heat flow path supporting said local oscillator.

2. In a microwave system employing a local oscillator having an excitation circuit whose operating voltage controls the generated microwave frequency, means for controlling the frequency generated by said oscillator, said means comprising a heat-supplying circuit including a thermal control element, and means providing a second heat flow path along which heat may be removed from said oscillator and transferred to said thermal control element by direct conduction thereto, to supplement the heat removal action produced by radiation and convection, and means in said second heat flow path operating to prevent escape to ground of any of the electric potential of said excitation circuit, while at the same time avoiding any appreciable interference with substantial heat flow.

3. In combination with a local oscillator having a casing in surrounding relation thereto, said casing having thermostatic circuit controlling means supported thereon for control of the operating temperature of said local oscillator, means for establishing a direct heat flow path from said oscillator to said thermostatic circuit controlling means, by way of said casing, said heat flow path including an element of good heat conductivity having substantial surface contact with both said oscillator and said casing.

4. In combination with a local oscillator having a casing in surrounding relation thereto, said casing having thermostatic circuit controlling means supported thereon for control of the operating temperature of said local oscillator, means for establishing a direct heat flow path from said oscillator to said thermostatic circuit controlling means, by way of said casing, said heat flow path including a two-pronged element of good heat conductivity having substantial surface contact with both said oscillator and said casing, and the two prongs of said heat-conducting element constituting resilient clamping means for maintaining firm contact between said element and said oscillator.

5. In combination with a local oscillator having an excitation circuit and a casing in surrounding relation thereto, said casing having thermostatic circuit controlling means supported thereon for control of the operating temperature of said local oscillator, means for establishing a direct heat flow path from said oscillator to said casing, said heat flow path including an element of good heat conductivity having substantial surface contact with both said oscillator and said casing, and means including an extremely thin sheet of insulating material interposed between said element and said casing to prevent grounding of said excitation circuit while avoiding substantial interference with heat flow to said casing.

6. In combination with a local oscillator having inner and outer casings spaced from said oscillator and from each other, said inner casing carrying thermostatic circuit controlling means for regulating the supply of heating current to said oscillator, heat conducting means having substantial surface contact with said oscillator for transferring heat to said thermostatic circuit controlling means by way of said inner casing, and means interposed between said heat conducting means and said inner casing to prevent grounding of the excitation current supply to said oscillator.

References Cited in the file of this patent

UNITED STATES PATENTS

| | | |
|---|---|---|
| 1,874,707 | Oswald | Aug. 30, 1932 |
| 2,371,790 | Bell | Mar. 20, 1945 |
| 2,397,985 | Schriefer | Apr. 9, 1946 |
| 2,439,809 | Hunter | Apr. 20, 1948 |